UNITED STATES PATENT OFFICE.

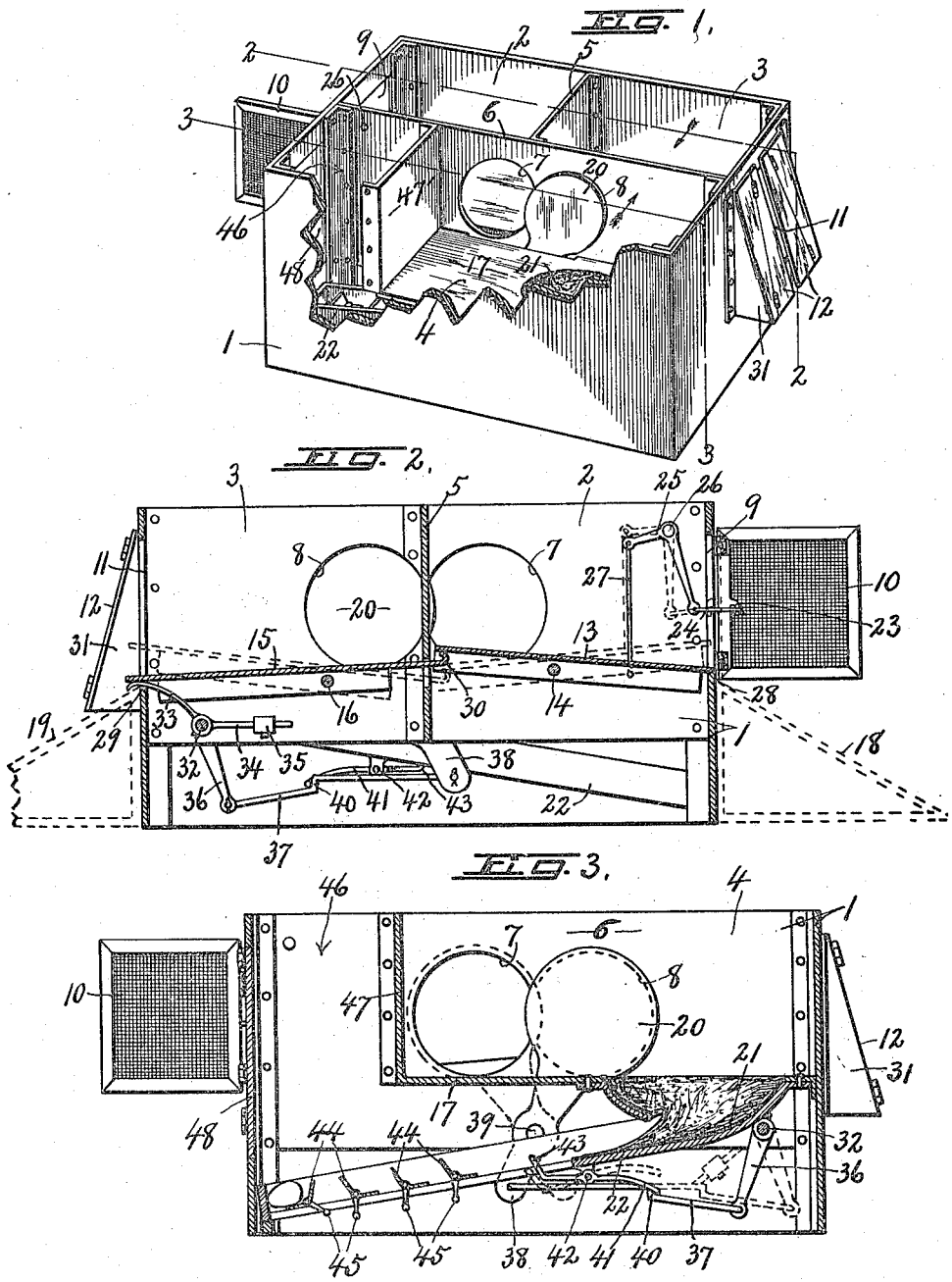

BENJAMIN F. SIGLER, OF LOCKE, NEW YORK.

TRAP-NEST.

1,194,432. Specification of Letters Patent. Patented Aug. 15, 1916.

Application filed April 6, 1915. Serial No. 19,442.

*To all whom it may concern:*

Be it known that I, BENJAMIN F. SIGLER, a citizen of the United States, and resident of Locke, in the county of Cayuga, in the State of New York, have invented new and useful Improvements in Trap-Nests, of which the following, taken in connection with the accompanying drawings, is a full, clear, and exact description.

This invention relates to certain improvements in poultry nests, commonly known as trap nests, to enable the farmer or attendant to keep a more accurate record of the breed and output of laying hens.

One of the objects is to avoid confining the hen within the nest by providing means whereby it may have free entrance and exit at any time irrespective of the laying of an egg.

Another object is to provide the nest compartment with a normally open entrance passage and a normally closed exit passage together with suitable means controlled by an egg which may be deposited in the nest for closing the entrance passage and opening the exit passage so as to prevent the return of the hen through the entrance and allow it to pass out only through the exit.

A further object is to provide means whereby the eggs which may be laid in the nest are automatically discharged therefrom to prevent the hen from eating or breaking the same.

A still further object is to provide means operated by the hen when passing out of the exit compartment for automatically opening the entrance door and closing the gate across the exit of the nest compartment.

Other objects and uses will be brought out in the following description.

In the drawings Figure 1 is a perspective view partly broken away of a trap nest embodying the various features of my invention. Figs. 2 and 3 are longitudinal vertical sectional views taken, respectively, on lines—2—2 and 3—3, Fig. 1 in the direction indicated by the arrows.

This trap nest comprises a case —1— having an entrance compartment —2—, an exit compartment —3— and a nest compartment —4—, the compartments —1— and —2— being alined with each other longitudinally of the nest, but are separated by an intervening partition —5—, while the compartment —4— is also separated from the compartments —2— and —3— by a lengthwise partition —6— except that it is provided with an entrance opening —7— and an exit opening —8— located adjacent to but at opposite sides of the partition —5— so as to connect said nest compartment —4— with the compartments —2— and —3—, respectively. The outer end of the compartment —2— is provided with an entrance opening —9— and a door or closure —10— therefor, while the opposite end of the case or outer end of the compartment —3— is provided with an exit opening —11— and self-closing doors —12—. These compartments are all preferably rectangular, the compartment —2— being provided with a tilting bottom —13— substantially coextensive with the interior horizontal area thereof and pivoted at —14— between its ends preferably nearer the inner end so as to allow it to rock vertically through a limited arc as will be hereinafter more fully described. The exit compartment —3— is also provided with a tilting bottom —15— pivoted intermediate its ends at —16— and preferably nearer its inner end so as to permit it to rock vertically within certain limits also hereinafter referred to more specifically.

The inlet and exit openings —9— and —11— leading to their respective compartments —2— and —3—, and also the inlet and exit openings —7— and —8— connecting said compartments respectively with the nest chamber —4— are disposed in approximately the same horizontal plane mainly above the tilting bottoms or platforms —13— and —15—, and also the relatively stationary bottom as —17— of the nest compartment —4—.

The opposite ends of the case may be provided with suitable inclines —18— and —19— leading to their respective openings —9— and —11— to enable the hens to pass readily to and from the compartments —2— and —3—, the entrances —9— and —7— leading respectively to the compartments —2— and —4— being normally open while the exit —8— is normally closed by a gate —20—, thus permitting a hen to pass into the compartment —2— and thence into the nest —4— and to return through the same passages in case of failure to lay an egg, while on the other hand, if the hen should deposit an egg in the nest it will operate a suitable trip to release the gate —20— and allow it to open the exit —8— and close the entrance —7—, thus permitting the hen to escape into the exit compartment —3— and thence outwardly through the opening —11— by pushing the self-closing doors —12— outwardly.

The bottom of the compartment —4— is provided near one end with a depressed portion —21— constituting a nest which may be suitably lined or covered with straw or other nesting material, said nest portion —21— constituting a hopper at one end of an inclined chute —22— which extends forwardly and downwardly toward the entrance end of the case for permitting the eggs to gravitate along the guide away from the nest as they are laid, thereby preventing the hen from eating or crushing such eggs.

The opening and closing of the entrance door —10— is controlled by the tilting movement of the bottom —13— of the entrance chamber —2—, and for this purpose the portion of the door near its hinged edge is provided with a lug —23— connected by a link —24— to one arm of a bell crank lever —25— which is pivoted at —26— to one of the upright sides of the compartment —2—, the other arm of the lever —25— being connected by a link —27— to the tilting bottom or platform —13— some distance in front of its axis of movement or pivot —14—.

A portion of the front edge of the bottom —13— projects into the opening —9— and normally engages an abutment —28— at the lower side of said opening, and in this instance, forming a part of the case —1— to limit the forward and downward tilting movement of said bottom. In like manner, the rear end of the tilting bottom or platform —15— extends into the opening —11— to normally rest against an abutment —29— for limiting the rearward tilting movement of said platform, it being understood that these platforms tend to assume their normal positions by reason of the predominance of weight in front of their respective pivots —14— and —16—. This predominance of weight, however, is only slight as compared with the weight of a hen which may travel along the platforms and it, therefore, follows that when a hen first enters the compartment —2— through the entrance —9— upon the front end of the platform —13—, it will be held in its normal position to keep the door open until the hen passes rearwardly to the rear of the axis of movement or pivot —14— of the platform where the opening —7— is located, whereupon the weight of the fowl upon the rear end of the platform will tilt it downwardly, thereby forcing the front end upwardly to close the door —10—. If, however, the hen should fail to lay an egg and should wish to pass out, it can do so by returning through the opening —7— and passing along the platform —13— to the front end thereof, which end will be instantly rocked downwardly along the incline —18— and open the door —10—.

The tilting of the platform —15— is utilized to restore the platform —13— and door —10— to their normal positions by providing the inner end of the platform with an extension —30— engaging the under side of the rear end of the platform —13—, as shown more clearly in Fig. 2, so that the hen in passing out through the exit —8— after laying an egg and walking along the platform —15— toward the exit opening —11— will rock the rear end of the platform downwardly to the limit of its movement, thereby elevating its forward end and causing a corresponding elevation of the rear end of the platform —13— and depression of the front end of the last named platform, which in turn will open the door —10— through the medium of the bell crank lever —25— and links —24— and —27—.

The exit doors —12— are disposed in an inclined plane and hinged at their outer edges along diagonal lines to the front walls of a hood or extension —31— on the rear end of the case, as shown more clearly in Fig. 1, so as to cause the doors to close by gravity, the meeting edges of the doors being spaced a slight distance apart to allow the head of a fowl to pass therethrough so that as it continues to pass out the body of the fowl will encounter and open the doors sufficiently to allow it to continue its exit down the incline —19—, after which the doors will automatically close by their own weight.

The rearward tilting movement of the platform —15— is also utilized to restore the gate —20— to its normal position across the exit opening —8—, and for this purpose I provide a rock shaft —32— journaled in opposite sides of the case —1— below the platform —15— and to which is secured a rearwardly projecting arm —33— bearing against the under side of the corresponding end of said platform, said shaft being provided with a weighted arm —34— carrying an adjustable weight —35— capable of rocking the rear end of the platform —15— upwardly through the medium of the arm —33—. Secured to this shaft is a crank arm —36— which is connected by a link —37— to an arm —38— on the gate —20—, said arm being pivoted at —39— to a downwardly extending portion of the partition —6— along which the gate is movable.

The link —37— is provided with a shoulder —40— for interlocking engagement with a detent —41—, the latter being pivoted at —42— to a lug on the under side of the chute —22— and is provided with an upward offset trip arm —43— projecting through a slot in the bottom of the chute, and therefore, into the path of movement of the eggs which may gravitate along said bottom from the nest —21—.

The detent —41— is normally interlocked with the shoulder —40— of the link —37— to hold the gate —20— in its normally closed position across the exit opening —8— against the action of the weighted arm —34—, as shown in the drawings, thus leaving the tilting platforms —13— and —15— free to rock independently of the rock arm —33— and also leaving the door —10— free to open and close to allow the fowl to enter and leave the compartments —2— and —4— through the openings —9— and —7—, it being understood that the door —10— is normally open and that as the fowl enters the compartment —2— upon the platform —13— and passes to the rear of the pivot —14—, the weight of the fowl on the rear end of said platform will depress the same, thereby elevating the front end and closing the door without in any way affecting the position of the gate —20—. On the other hand, if the fowl fails to lay an egg, it may return from the nest chamber —4— through the passage —7— and to the compartment —2— along the platform —13— so that when it passes to the front of the pivot —14—, its weight will tilt the front end of the platform —13—, thereby opening the door and allowing the fowl to pass outwardly and downwardly along the incline —18—, thus permitting the entrance of the same or another fowl to the nest and preventing the entrance of more than one fowl at a time, by reason of the fact that the door remains closed as long as a fowl is upon the nest. If, however, an egg should be laid by the fowl on the nest, such egg would instantly gravitate downwardly along the chute —22— and trip the detent —41—, thus permitting the fall of the weighted arm —34— to shift the gate —20— from the exit —8— across the entrance opening —7— through the medium of the link —37—, and at the same time causing the arm —33— to rock upwardly against the under side of the rear end of the platform —15— which is then elevated to the position shown by dotted lines, by reason of the fact that the door —10— is then closed. It is now clear that this automatic closing of the entrance passage —7— by the gate —20— and opening of the exit —8— prevents the return of the fowl into the entrance compartment —2— and allows it to pass out through the exit —8— into the compartment —3— along the platform —15— and thence through the exit opening —11— and doors —12— along the incline —19—, during which exit the weight of the fowl upon the rear end of the platform —15— will restore such platform and also the door —10— and gate —20— to their normal positions, that is the depression of the rear end of the platform —15— will rock the arm —33— downwardly against the action of the weighted arm —34— to shift the gate from the entrance opening —7— to the exit opening —8— through the medium of the link —37—, and at the same time will force the shoulder —40— of said link into position to be engaged to the detent —41— which is weighted so as to drop automatically into its holding position. During this operation, the front end of the platform —15— will engage and elevate the rear end of the platform —13—, thereby depressing the front end of the last named platform to open the door —10— through the medium of the links —24— and —27— and bell crank lever —25—.

In order that the speed of travel of the eggs downwardly along the chute —22— may be somewhat retarded and also that they may be prevented from contacting one with the other to prevent breakage, I provide the chute with a series of angular retarding members consisting of thin sheet metal angle plates —44— pivoted at their angles to the bottom of the chute in sequence uniform distances apart so that one or the other of their sides will lie flat against said bottom, each plate being provided with a counter-weight —45— arranged to normally return and hold the upper side of its corresponding plate flatwise against the bottom, while the lower side projects upwardly in an inclined plane in the path of the moving egg to be engaged thereby and rocked downwardly against the action of the counter-weight —45— to allow the egg to pass over the plate and rest upon its depressed lower side, thereby bringing the upper side of the plate into position to form an abutment against which the next succeeding egg may rest, the plates being spaced in such relation that when an egg rests upon the lower side of one of them, the next succeeding egg will still rest upon the lower side of the next adjacent plate and rest against the upstanding flange of the next preceding plate, the counter-weight —45— serving the double purpose of retarding the too speedy descent of the egg and also of restoring the plates to their normal positions when the eggs are removed.

The lower end of the chute extends to a point in proximity to the front end of the case which is provided with a relatively small compartment —46— directly in front of the nest compartment —4— and separated therefrom by a partition —47— to prevent access to the nest by the hen, and at the same time affording a temporary container for the eggs until they can be removed by the attendant, the front portion of this compartment —46— being provided with a removable door —48— to permit access thereto for removing the eggs.

The operation of my invention will now be readily understood upon reference to the foregoing description and the accompanying drawings, but it is evident that many of the parts may be substituted by substantial equivalents without departing from the spirit of this invention, so I do not limit myself to the precise construction shown and described.

What I claim is:

1. In a trap nest, an exit chamber and an entrance chamber, each having an opening in one end, a door for the entrance opening, tilting platforms in the bottoms of said chambers, connections between said platforms for transmitting rocking motion from one to the other, additional connections between the entrance platform and door for opening and closing said door as such platform is rocked in reverse directions, a nest chamber communicating with the entrance chamber and exit chamber through separate passages, a gate movable into and out of registration with each of said passages, means for automatically closing the gate across the entrance passage, and additional means actuated by the tilting of the exit platform in one direction for shifting the gate from the entrance passage across the exit passage.

2. In a trap nest, an exit chamber and an entrance chamber, each having an opening in one end, a door for the entrance opening, tilting platforms in the bottoms of said chambers, connections between said platforms for transmitting rocking motion from one to the other, additional connections between the entrance platform and door for opening and closing said door as such platform is rocked in reverse directions, a nest chamber communicating with the entrance chamber and exit chamber through separate passages, a gate movable into and out of registration with each of said passages, means for automatically closing the gate across the entrance passage, additional means actuated by the tilting of the exit platform in one direction for shifting the gate from the entrance passage across the exit passage, and means for locking the gate-operating means in the last named position.

3. In a trap nest, an exit chamber and an entrance chamber, each having an opening in one end, a door for the entrance opening, tilting platforms in the bottoms of said chambers, connections between said platforms for transmitting rocking motion from one to the other, additional connections between the entrance platform and door for opening and closing said door as such platform is rocked in reverse directions, a nest chamber communicating with the entrance chamber and exit chamber through separate passages, a gate movable into and out of registration with each of said passages, means for automatically closing the gate across the entrance passage, additional means actuated by the tilting of the exit platform in one direction for shifting the gate from the entrance passage across the exit passage, means for locking the gate-operating means in the last named position, and further means operated by an egg deposited in the nest chamber for tripping said holding means to allow the gate to open the exit and close the entrance opening.

In witness whereof I have hereunto set my hand this 27th day of March, 1915.

BENJAMIN F. SIGLER.

Witnesses:
H. E. CHASE,
ALICE M. CANNON.

Copies of this patent may be obtained for five cents each, by addressing the "Commissioner of Patents, Washington, D. C."